United States Patent
Koma

(10) Patent No.: US 8,549,517 B2
(45) Date of Patent: Oct. 1, 2013

(54) ADDRESS ASSIGNMENT METHOD, COMPUTER, AND RECORDING MEDIUM HAVING PROGRAM RECORDED THEREIN

(75) Inventor: Junichiro Koma, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 596 days.

(21) Appl. No.: 12/632,332

(22) Filed: Dec. 7, 2009

(65) Prior Publication Data

US 2010/0162241 A1 Jun. 24, 2010

(30) Foreign Application Priority Data

Dec. 19, 2008 (JP) ................................. 2008-324443

(51) Int. Cl.
*G06F 9/455* (2006.01)

(52) U.S. Cl.
USPC ............................................................ 718/1

(58) Field of Classification Search
USPC .................................................... 718/1, 100
See application file for complete search history.

(56) References Cited

U.S. PATENT DOCUMENTS

| 7,738,457 | B2* | 6/2010 | Nordmark et al. ............ 370/392 |
| 7,752,635 | B2* | 7/2010 | Lewites ........................ 719/327 |
| 8,060,875 | B1* | 11/2011 | Lambeth ........................... 718/1 |
| 2006/0107087 | A1* | 5/2006 | Sieroka et al. ..................... 714/4 |
| 2007/0140263 | A1 | 6/2007 | Mitome et al. |
| 2007/0168563 | A1 | 7/2007 | Jha et al. |
| 2007/0276897 | A1 | 11/2007 | Tameshige et al. |
| 2008/0195756 | A1* | 8/2008 | Galles ........................... 709/245 |

FOREIGN PATENT DOCUMENTS

| JP | 2007-158870 | 6/2007 |
| JP | 2007-193779 | 8/2007 |
| JP | 2007-316724 | 12/2007 |

* cited by examiner

*Primary Examiner* — Van Nguyen
(74) *Attorney, Agent, or Firm* — Staas & Halsey LLP

(57) ABSTRACT

An address assignment method includes a first notification step of selecting a range of use of addresses to be assigned to the virtual network interface card from the set of addresses, and notifying another physical machine of the range of use via a network, the first notification step being carried out by the physical machine that creates the virtual machine; a storage step of storing the range of use, the storage step being carried out by the physical machine notified of the range of use at the first notification step; and a second notification step of selecting the range of use of addresses to be assigned to the virtual network interface card in the virtual machine to be created from the set of addresses excluding the stored range of use, and notifying another physical machine of the range of use via the network.

6 Claims, 11 Drawing Sheets

FIG. 3

| PHYSICAL MACHINE NAME | START MAC ADDRESS | END MAC ADDRESS |
|---|---|---|
| #ALL | 02:17:42:2F:00:00 | 02:17:42:2F:00:FF |
| host1 | 02:17:42:2F:00:00 | 02:17:42:2F:00:0F |
| host2 | 02:17:42:2F:00:10 | 02:17:42:2F:00:1F |
| ... | ... | ... |

FIG. 4

| MAC ADDRESS | STATE OF USE |
|---|---|
| 02:17:42:2F:00:00 | 1 |
| 02:17:42:2F:00:01 | 1 |
| 02:17:42:2F:00:02 | 0 |
| 02:17:42:2F:00:03 | 0 |
| ... | ... |
| 02:17:42:2F:00:0F | 0 |

ADDRESS ASSIGNMENT METHOD, COMPUTER, AND RECORDING MEDIUM HAVING PROGRAM RECORDED THEREIN

CROSS-REFERENCE TO RELATED APPLICATIONS

This application is based upon and claims the benefit of priority of the prior Japanese Patent Application No. 2008-324443, filed on Dec. 19, 2008, the entire contents of which are incorporated herein by reference.

FIELD

Various embodiments described herein relate to a technique for assigning an address selected from a set of addresses shared among physical machines to a virtual network interface card (NIC) in a virtual machine created by a physical machine.

BACKGROUND

In recent years, there is a trend toward large-scale systems for providing services with the use of servers via the Internet. In a large-scale system, a number of computers (servers) need to be introduced. As a result, the computer introduction costs and operation costs become very high. In view of this, attention has been recently drawn to a virtual machine (VM) technique for restricting the introduction costs and the operation costs to low values.

The virtual machine technique is a technique for virtualizing hardware and operating an operating system (OS) on the virtualized hardware. Where several sets of virtual hardware are prepared, several OSs need to be operated at the same time. Each OS operated by the virtualized hardware logically realizes a computer. The logically realized computers are called "virtual machines".

By the virtual machine technique, one or more virtual machines can be created in a physically existing computer (a physical machine). Each virtual machine can be used as a server. Accordingly, the number of computers (physical machines) to be introduced can be made smaller. Thus, the introduction costs and the operation costs can be made lower.

Each virtual machine operates as a computer. Therefore, each virtual machine needs to be uniquely identified among virtual machines or in a connection to an external network. To realize this, a virtual network interface card (NIC) is constructed in each virtual machine, and an address is assigned to the virtual NIC. The address is normally a MAC (Media Access Control) address. A MAC address is assigned as the unique ID number to each Ethernet card ("Ethernet" is a registered trade name). MAC addresses are data that indicate the destinations of packets in the data link layer (the second layer) of the OSI (Open Systems Interconnection) reference model.

FIG. 12 illustrates the system structures of conventional physical machines (computers). The system structures in FIG. 12 illustrate the environment of each physical machine 1200 that has created virtual machines. Referring to FIG. 12, the system structure of each conventional physical machine and the assignment of MAC addresses to virtual NICs are described.

In FIG. 12, two physical machines 1200 connected to each other by a network 30 are illustrated. A physically existing NIC 1201 (hereinafter referred to as the "physical NIC 1201" to be distinguished from virtual NICs) is attached to each of the physical machines 1200. In FIG. 12, each reference numeral 1210 indicates a hypervisor (a virtual machine monitor), each reference numeral 1220 indicates a virtual machine for managing the other virtual machines, and each reference numeral 1230 indicates a virtual machine to be operated by an application program (hereinafter referred to simply as the "application"). An OS (a management OS) having a function to manage the other virtual machines is operated in the virtual machine 1220, and a guest OS is operated in each of the virtual machines 1230.

The hypervisor 1210 creates the virtual machines, and performs hardware (not illustrated) assignment dynamically and transparently. Accordingly, the virtual machines 1220 and 1230 can simultaneously operate in one physical machine.

A virtual NIC 1231 is formed in each of the virtual machines 1230, and a virtual NIC 1232 having the same MAC address as the MAC address assigned to the physical NIC 1201 is formed in the virtual machine 1220 for management (hereinafter referred to as the management virtual machine 1220). The physical NIC 1201 has its MAC address changed or is set in a promiscuous mode, so as to receive all packets. In the management virtual machine 1220, an operations management system 1221 that is a program for managing the operations of the other virtual machines 1230 exists, as well as various drivers to be used for accessing physical hardware. Assignment of a MAC address to each virtual NIC 1231 is performed directly or indirectly by the operations management system 1221.

A virtual network 1202 is formed in each of the physical machines 1200, so as to connect the virtual machines 1230 to each other or connect the virtual machines 1230 to the network 30 via the physical NIC 1201. The virtual network 1202 is formed with the use of fabricated virtual switches.

MAC addresses that can be assigned to the virtual NICs 1231 are prepared in advance. If two or more physical machines 1200 exist, the set of prepared MAC addresses is shared among the physical machines 1200. Accordingly, a MAC address selected from the set of prepared MAC addresses is assigned to each virtual NIC 1231.

By a conventional method (a direct method) for assigning a MAC address to a virtual NIC 1231, the operations management system 1221 randomly selects a MAC address from the set of MAC addresses for each physical machine 1200. By this method, however, there is a possibility that a MAC address already assigned to a virtual NIC 1231 in a physical machine 1220 is assigned to a virtual NIC 1231 in another physical machine 1200.

By another conventional method (an indirect method) for assigning a MAC address, a user (an operator) manages assignment via the console 20, so as not to cause overlapping. By this method, however, there is a possibility that the user inadvertently assigns a MAC address to two different virtual NICs 1231. Furthermore, the user is required to do complicated tasks.

In view of the above, where a set of MAC addresses are shared among conventional physical machines 1200, there is a possibility that a MAC address is assigned to two or more virtual NICs 1231. If such overlapping is caused, communications cannot be performed properly. Therefore, there has been a demand for appropriate assignment of MAC addresses without overlapping.

Overlapped assignment of a MAC address can be prevented by preparing a computer (a server) that manages the set of shared MAC address in an integrated manner. Where such a computer is prepared, however, assignment of MAC addresses cannot be performed when the computer is stopped. Furthermore, the introduction of the computer causes an increase in cost. As a result, the advantages of the virtual machine technique are reduced. Therefore, it is considered important that appropriate assignment of MAC address without overlapping is made possible without introduction of another computer or integrated management of the set of MAC addresses. Appropriate assignment of MAC addresses without overlapping is disclosed in Japanese Patent Application Laid-Open Nos. 2007-158870, 2007-193779, and 2007-316724, for example.

SUMMARY

An address assignment method includes a first notification step of selecting a range of use of addresses to be assigned to the virtual network interface card from the set of addresses, and notifying another physical machine of the range of use via a network, the first notification step being carried out by the physical machine that creates the virtual machine; a storage step of storing the range of use, the storage step being carried out by the physical machine notified of the range of use at the first notification step; and a second notification step of selecting the range of use of addresses to be assigned to the virtual network interface card in the virtual machine to be created from the set of addresses excluding the stored range of use, and notifying another physical machine of the range of use via the network.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

BRIEF DESCRIPTION OF DRAWINGS

FIG. 3 illustrates the data structure of a MAC address assignment common table 201;

FIG. 4 illustrates the data structure of a MAC address assignment table 202;

DESCRIPTION OF EMBODIMENTS

The various embodiments aim to provide a technique for assigning addresses to virtual NICs by physical machines in a non-overlapping manner while the set of addresses (MAC addresses) to be shared among the physical machines are not managed in an integrated fashion.

In a system to which the various embodiments are applied, when an address in the set of addresses shared among physical machines (computers) is assigned to a virtual network interface card (NIC) in a virtual machine created by a physical machine, the physical machine creating the virtual machine selects a range of use of addresses to be assigned to the virtual NIC from the set of addresses, and notifies the other physical machines of the range of use via a network. Each physical machine notified of the range of use stores the range of use. The physical machine having stored the range of use selects a range of use of addresses to be assigned to virtual NICs in virtual machines to be created, from the set of addresses excluding the stored range of use. The physical machine then notifies the other physical machines of the range of use via the network.

As described above, each of the physical machines in operation notifies the other physical machines of the addresses secured for its own machine. Through the notification, the physical machines sharing the set of addresses, or, to be more accurate, all the physical machines in operation among the physical machines, share the information about the addresses secured for the respective physical machines. Any of the physical machines can accurately designate a usable address in the set of addresses. As a result, the set of addresses are not managed in an integrated manner by a certain computer, and assignment of an address to two different virtual NICs can be certainly prevented. The existence of stopped physical machines among the physical machines does not affect any operations.

The following is a detailed description of embodiments, with reference to the accompanying drawings.

Figure 1:
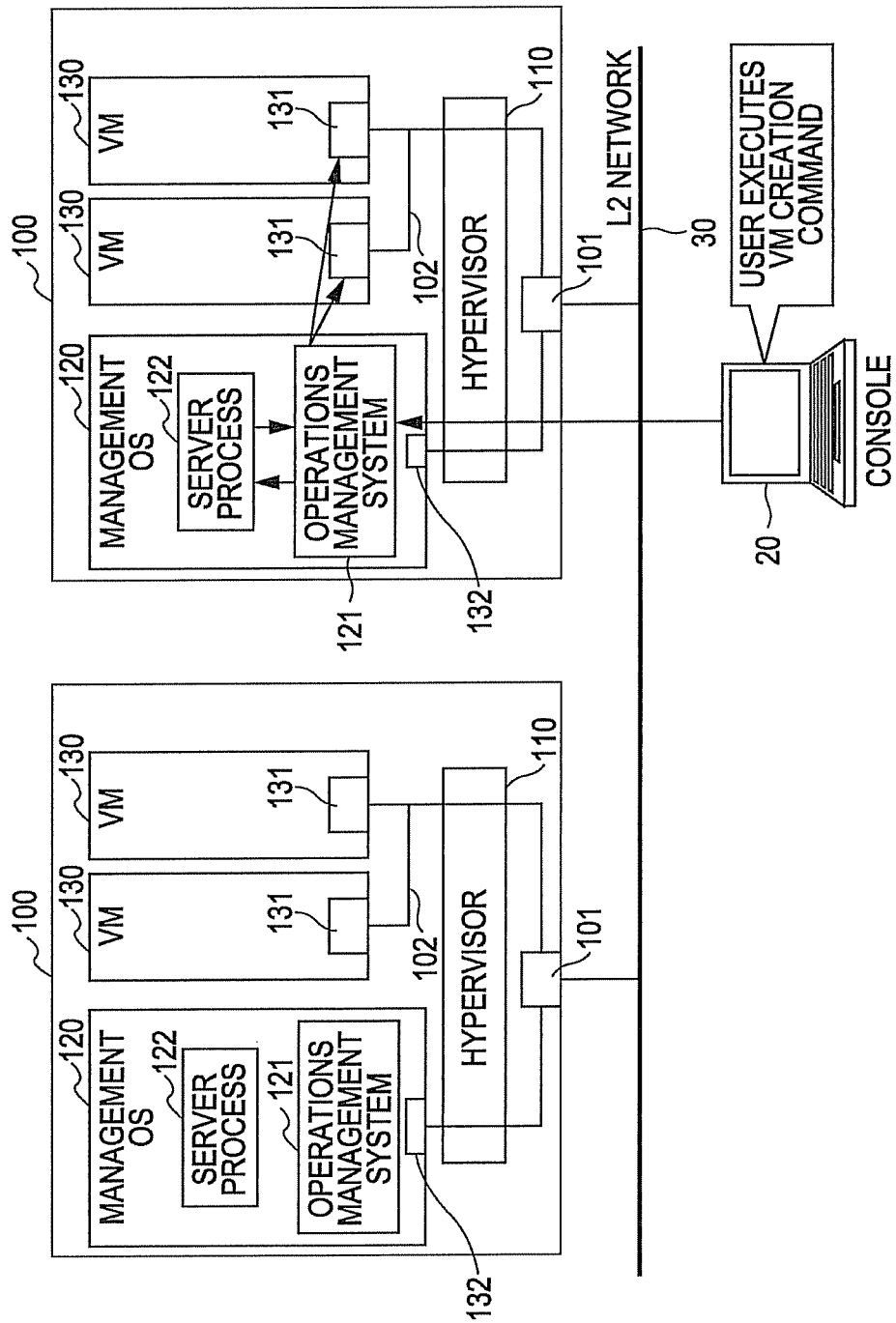
FIG. 1 illustrates the system structures of computers (physical machines) according to an embodiment of the present invention.
Figure 12:
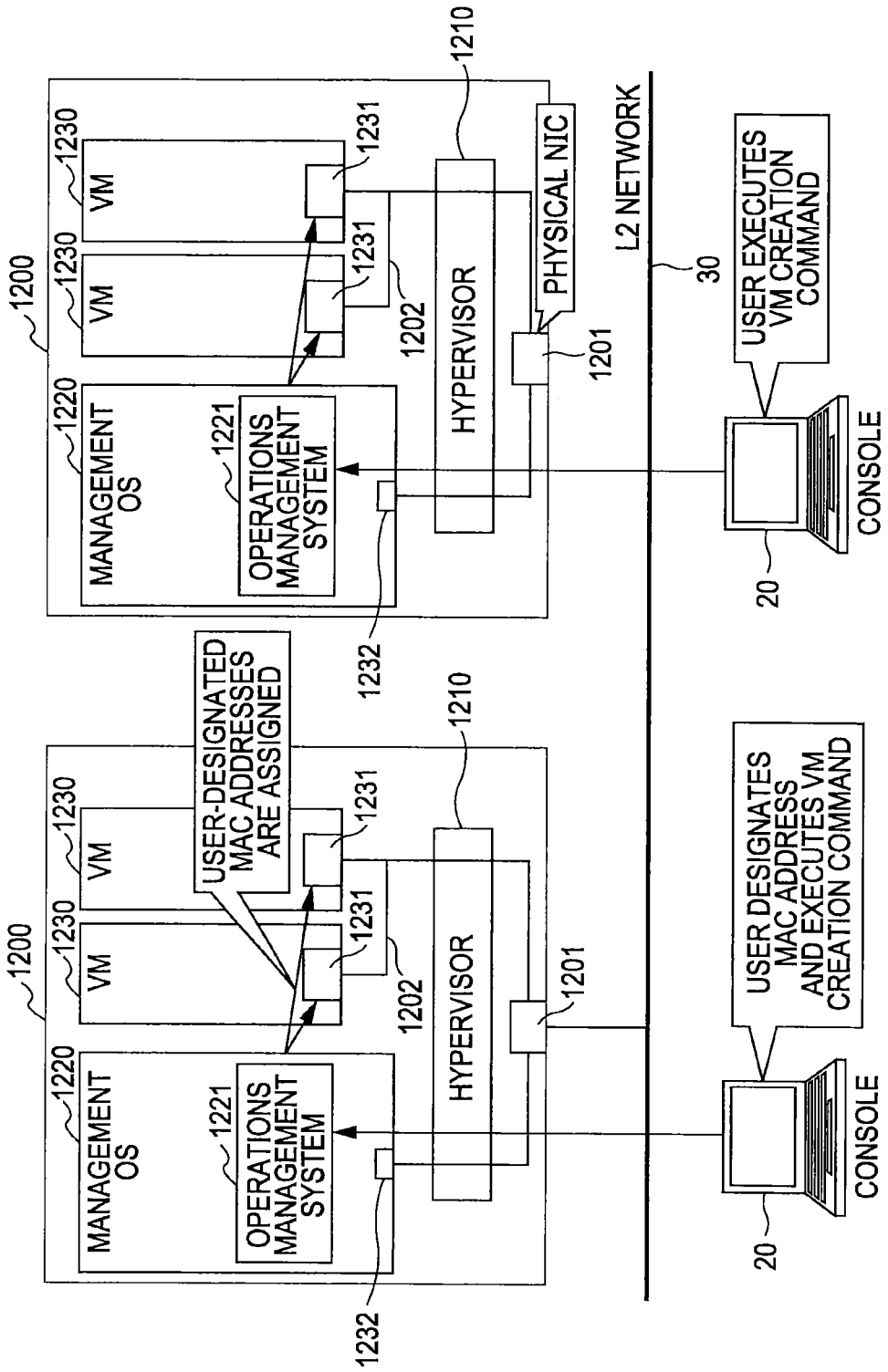
FIG. 12 illustrates the system structures of conventional computers (physical machines).

FIG. 1 illustrates the system structure of computers (physical machines) according to this embodiment. Like FIG. 12, FIG. 1 illustrates the environment observed when the physical machines 100 are operating. The physical machines 100 are used as servers that provide services to users of terminal devices connected to the physical machines 100 via a network, such as the Internet.

As illustrated in FIG. 1, in each of the two physical machines 100 connected by the network 30, a physical NIC (Network Interface Card) 101 is provided to perform communications via the network 30, and a hypervisor 110 that operates directly by hardware including the physical NIC 101 is operated. Virtual machines 120 and 130 created in the physical machine 100 operate by the hypervisor 110. The hypervisor 110 creates the virtual machines 120 and 130, and assigns hardware dynamically and transparently, so as to operate the respective virtual machines 120 and 130.

In each of the virtual machines 130, a guest OS operates. In the virtual machine 120, a management OS (host OS) that manages the virtual machines 130 each having a guest OS operating is in operation. In this embodiment, an operations management system 121, which is a program for managing the operations of the virtual machines 130, and a MAC address distribution server process 122, which is a program for managing MAC address assignment to virtual NICs, are provided in the management OS. Accordingly, each computer according to this embodiment is realized by operating the operations management system 121 and the MAC address distribution server process (hereinafter referred to simply as the "server process") 122 in the virtual machine 120. The virtual machine 120 having the operations management system 121 and the server process 122 will be hereinafter referred to as the "management virtual machine", so as to distinguish from the virtual machines 130 each having a guest OS operating.

In the system structure illustrated in FIG. 1, the hypervisor 110 creates the management virtual machine 120 without precondition. After creating the management virtual machine 120, the hypervisor 110 creates the virtual machines 130 in accordance with an instruction from a user (an operator) through setting or via a console 20.

In each of the virtual machines 130, a virtual NIC 131 for communications is provided. Each of the virtual machines 130 and the physical NIC 101 are connected to a virtual network 102. Accordingly, the virtual machines 130 can be connected to each other, and also can be connected to the network 30. The virtual network 102 is constructed with the use of fabricated virtual switches.

Figure 2:
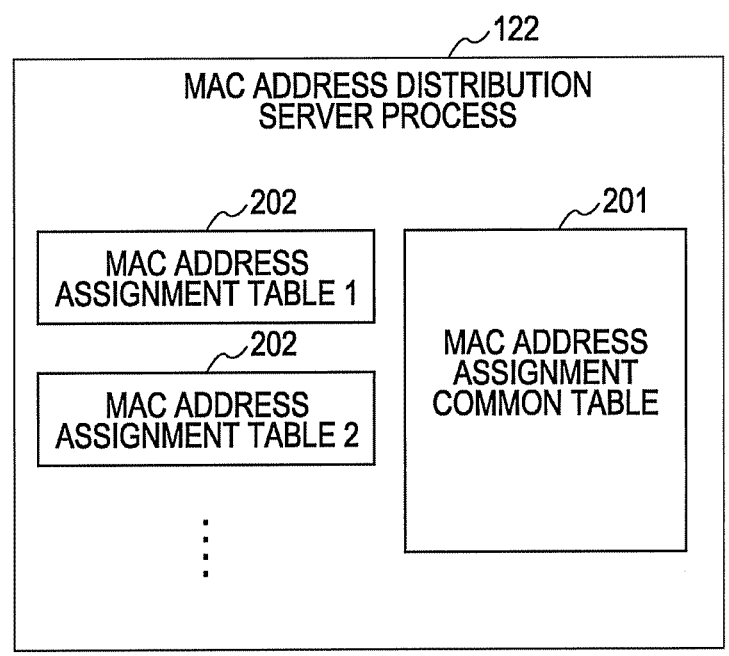
FIG. 2 illustrates the information that is managed by a MAC address distribution server process 122.

FIG. 2 illustrates the information that is managed by the server process 122. As illustrated in FIG. 2, the server process 122 manages a MAC address assignment common table (hereinafter referred to simply as the "common table") 201 and MAC address assignment tables (hereinafter referred to simply as the "assignment tables") 202.

MAC addresses are assigned to the fabricated virtual NICs 131. The range of assignable MAC addresses (a set of MAC addresses) is shared among physical machines including the two physical machines 100 illustrated in FIG. 1. The common table 201 is a table designed so that no two virtual NICs 131 have the same MAC address assigned thereto, and the physical machines 100 share the set of MAC addresses.

A virtual NIC 132 is also provided in each management virtual machine 120. The same MAC address as that assigned to the corresponding physical NIC 101 is assigned to the virtual NIC 132. Therefore, unlike the virtual NICs 131, the virtual NICs 132 are excluded from the subjects to which the MAC addresses of the set of MAC addresses are to be assigned.

FIG. 3 illustrates the data structure of the common table 201. The data indicating the range of use of MAC addresses used by each physical machine 100 is stored in the common table 201. The name of each physical machine 100 is used as the data uniquely representing the physical machine 100, and the range of use of MAC addresses is indicated by the start MAC address located at the top of the range of use and the end MAC address located at the end of the range of use. The information formed with those data will be hereinafter referred to as the "use range information".

In FIG. 3, "host 1" and "host 2" indicate the physical machine names given to two of the physical machines 100. The physical machine name "#ALL" represents all the physical machines. Accordingly, the use range information having "#ALL" as the physical machine name represents the set of MAC addresses shared among the physical machines 100 by means of the start MAC address and the end MAC address. The other use range information represents the use range of MAC addresses to be used by each physical machine 100 in the set of MAC addresses.

In view of this, the common table 201 illustrates the set of MAC addresses shared among the physical machines 100, and the range of use of MAC addresses used by each of the physical machines 100. The common table 201 is shared among the physical machines 100. Each of the physical machines 100 updates the common table 201 only by registering or deleting the use range information of its own, and distributes the updated common table 201 to the other physical machines 100. Through the distribution, the consistency of the common table 201 is maintained among all the physical machines 100 sharing the set of MAC addresses. Accordingly, each of the physical machines 100 refers to the common table 201, and assigns an unused MAC address of the set of MAC addresses to the virtual NIC 131. In this manner, assignment of the same MAC address to more than one virtual NIC 131 can be certainly prevented.

Each of the assignment tables 202 manages the MAC addresses used by the corresponding physical machine 100.

In the common table 201 illustrated in FIG. 3, the physical machine 100 having the physical machine name "host 1" has a range of use of MAC addresses including the sixteen addresses 02:17:42:2F:00:00 through 02:17:42:2F:00:0F. Likewise, the physical machine 100 having the physical machine name "host 2" has a range of use of MAC addresses including the sixteen addresses 02:17:42:2F:00:10 through 02:17:42:2F:00:1F. In this embodiment, each range of use of MAC address is set on a predetermined number (sixteen in this example) basis. Each of the assignment tables 202 is used to manage the assignment of MAC addresses on the predetermined number basis. Therefore, if more MAC addresses than the predetermined number are used, two or more assignment tables 202 are created for the physical machine 100.

FIG. 4 illustrates the data structure of each of the assignment tables 202. As illustrated in FIG. 4, combinations of MAC addresses and states of use (represented by flags) are registered in each of the assignment tables 202. Accordingly, a check can be made to determine whether each MAC address is being used. Each of the states of use (represented by the value of a flag) is "1" when the corresponding MAC address is in use, and is "0" when the corresponding MAC address is not in use.

The server process 122 manages the common table 201 and the assignment tables 202. When a MAC address is to be assigned to a virtual NIC 131, the MAC address to be assigned is determined in response to a request from the operations management system 121, and notifies the operations management system 121 of the MAC address. In accordance with the notification, the operations management system 121 assigns the MAC address to the virtual NIC 131. In this manner, a MAC address that is not being used by any other physical machine 100 is assigned to a virtual NIC 131.

Figure 5:
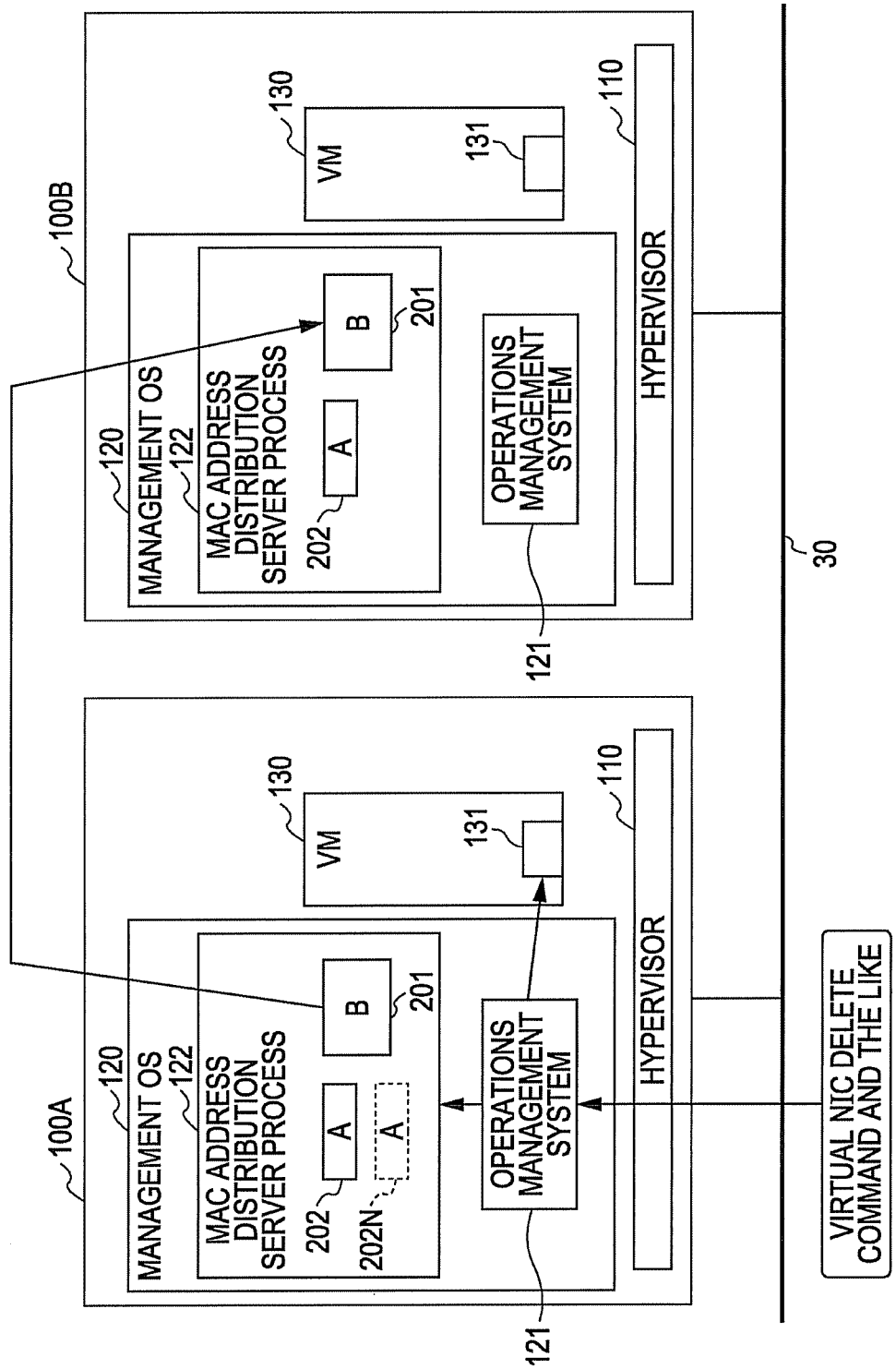
FIG. 5 is a diagram for explaining the operations of each physical machine 100 in various situations.

FIG. 5 is a diagram for explaining operations of each of the physical machines 100 on a case-by-case basis. Referring to FIG. 5, operations of two physical machines 100 are described in detail on a case-by-case basis. The following situations are considered: a situation where the set of MAC addresses to be shared is initially introduced; a situation where other physical machines 100 (the second and more physical machines 100) are in operation (added); a situation where a MAC address is assigned while other physical machines 100 are in operation; a situation where an already assigned MAC address is released or assignment of a MAC address to a virtual NIC 131 is canceled, while other physical machines 100 are in operation; and a situation where a physical machine 100 is deleted (stopped). For ease of explanation, the physical machine in which the set of MAC addresses is introduced, the physical machine assigning MAC addresses or canceling the assignment of MAC addresses, and the physical machine to be deleted are represented by a physical machine 100A. The physical machine to be activated after the activation of the physical machine 100A is a physical machine 100B.

First, the operation to be performed at the time of initial introduction of the set of MAC addresses is described. The initial introduction is normally performed on the physical machine 100 (100A) that is first activated among the physical machines 100. After the activation, the hypervisor 110 creates the management virtual machine 120.

The set of MAC addresses to be shared are input from the console 20, for example, to the physical machine 100A. The input set of MAC addresses are transmitted to the server process 122 via the hypervisor 110 and the operations management system 121. The server process 122 then registers the use range information having "#ALL" as the physical machine name into the common table 201. After that, the server process 122 determines the range of MAC addresses to be used by the physical machine 100A. The server process 122 then creates an assignment table 202, and updates the common table 201 in accordance with the determined range of MAC addresses. In this manner, the server process 122 makes a preparation for assignment of a MAC address to a virtual NIC 131. The update of the common table 201 is performed by registering the use range information having the name of the physical machine 100A as the physical machine name into the common table 201.

The set of MAC addresses to be shared is determined by a network manager, for example. The set of MAC addresses may be provided in the file to which the hypervisor 110 refers at the time of activation.

Next, the operation to be performed when another physical machine 100B (the second or later physical machine 100) is activated is described.

The activated physical machine 100B notifies the physical machine 100A of its participation in the network 30 via the physical NIC 101. Receiving the notification, the physical machine 100A sends a response to the physical machine 100B, or transmits the common table 201 to the physical machine 100B. In accordance with the response, the physical machine 100B recognizes that the input of the set of MAC addresses to be shared is not necessary. The physical machine 100B waits to receive the common table 201, and stores the common table 201. After the storing, the range of MAC addresses to be used by the physical machine 100B is determined, and an assignment table 202 is created. The common table 201 is updated in accordance with the determined range of MAC addresses, and the updated common table 201 is transmitted (distributed) to the other physical machines 100 including the physical machine 100A. Receiving the updated common table 201, the physical machine 100A stores the updated common table 201 in place of the common table 201 owned so far by the physical machine 100A. In this manner, the consistency of the common table 201 is maintained. As illustrated in FIG. 5, the common table 201 and at least one assignment table 202 are stored in the activated physical machine 100B.

In the above manner, the latest common table 201 is stored in the physical machine 100B immediately after activation. Accordingly, the physical machine 100B can certainly perform assignment of a MAC address that is unused.

When a MAC address is assigned while other physical machines 100 are in operation, the physical machine 100A and the physical machine 100B operate in the following manner. Assignment of a MAC address is performed through creation of a virtual NIC 131 or the like. The creation of the virtual NIC 131 is performed through creation of the virtual machine 130 owing the virtual NIC 131, or in accordance with a user instruction input via the console 20.

The physical machine 100A refers to the existing assignment table 202, and searches for an unused MAC address. When an unused MAC address is extracted, the extracted MAC address is assigned to the virtual NIC 131, and the state of use of the MAC address is changed to "in use". When an unused MAC address cannot be found, a new range of use of MAC addresses to be used by the physical machine 100A is determined with reference to the common table 201. In accordance with the determination, another assignment table 202 is created, and the common table 201 is updated by registering the new use range information in the common table 201. The updated common table 201 is transmitted to the physical machine 100B. After that, a MAC address extracted from the MAC addresses registered in the newly created assignment table 202 is assigned to the virtual NIC 131, and the state of use of the MAC address is changed to "in use". In FIG. 5, the existing assignment table 202 is indicated by solid lines, and the newly created assignment table is denoted by 202N and is indicated by dotted lines.

As described above, in this embodiment, an increase in the number of required MAC addresses is dealt with by creating an assignment table 202 whenever necessary. Accordingly, waste of the MAC address resource caused by assigning unnecessary MAC addresses to a number of physical machines 100, and the number of times the common table 201 is updated are both restricted.

When an already assigned MAC address is released or assignment of a MAC address is canceled while other physical machines 100 are activated, the physical machine 100A and the physical machine 100B operate in the following manner. Releasing a MAC address is performed by deleting a virtual NIC 131 or the like. The deleting of the virtual NIC 131 is performed by deleting (stopping) the virtual machine 130 including the virtual NIC 131 or in accordance with a user instruction input via the console 20 or the like.

The physical machine 100A refers to the assignment table 202, and changes the state of use of the MAC address to be released to "not in use". If all the MAC addresses in the changed assignment table 202 become "not in use", the assignment table 202 is deleted, and the range of MAC addresses managed by the assignment table 202 is considered unnecessary. Therefore, the common table 201 is updated by deleting the use range information representing the MAC addresses in that range. The updated common table 201 is distributed to the other physical machines 100. In FIG. 5, the assignment table to be deleted is denoted by 202N and is indicated by dotted lines.

As described above, in this embodiment, a decrease in the number of necessary MAC addresses is dealt with by deleting an assignment table 202 whenever necessary. Accordingly, the MAC addresses that have become unnecessary in one physical machine 100 are allowed to be used in another physical machine 100, and the decrease of the use efficiency of the MAC address resource is restricted.

Lastly, the operations to be performed by the physical machine 100A and the physical machine 100B when the physical machine 100A is deleted (stopped) are described.

In the physical machine 100A to be stopped, the MAC addresses become unnecessary. Therefore, the physical machine 100A updates the common table 201 by deleting all the use range information registered in the common table 201 by the physical machine 100A. The physical machine 100A then transmits the updated common table 201 to the physical machine 100B. The physical machine 100B stores the updated common table 201 in place of the common table 201 stored so far. In the newly stored common table 201, there is no use range information having the name of the physical machine 100A as a physical machine name.

When a change is caused in the MAC addresses to be used by a physical machine 100 on the predetermined number basis as described above, the common table 201 reflecting the change is distributed to the other physical machines 100, and is used for new assignment of MAC addresses. Accordingly, accurate assignment of MAC addresses without overlapping can be constantly performed in the physical machines 100 in operation.

Referring now to the flowcharts illustrated in FIGS. 6 to 10, the operations to be performed by the server process 122 in the respective situations are described in detail. In FIGS. 6 to 10, the common table 201 is referred to as "common table", and each assignment table 202 is referred to as "table", so as to distinguish the two types of tables from each other.

Figure 6:
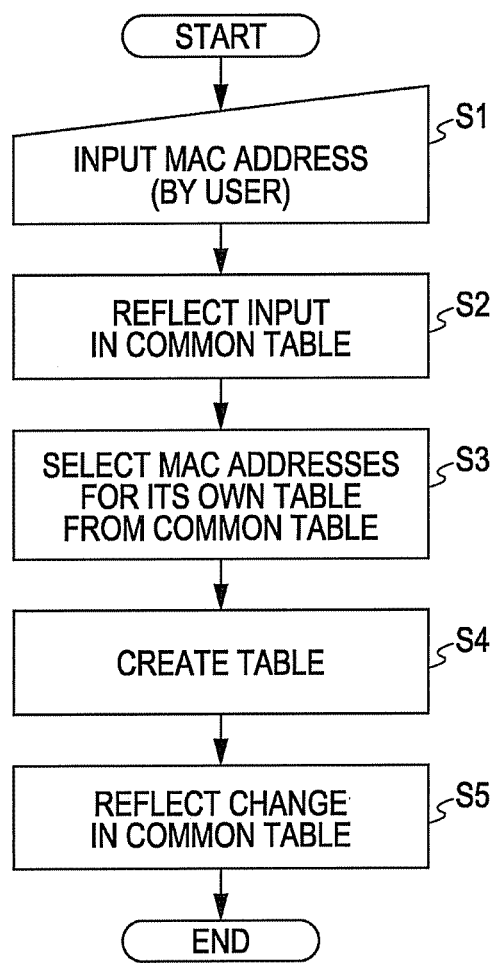
FIG. 6 is a flowchart of an initial introduction operation.

FIG. 6 is a flowchart of the initial introduction operation. The initial introduction operation is performed to introduce the set of MAC addresses, only when the other physical machines 100 sharing the set of MAC addresses are not in operation. Referring first to FIG. 6, the initial introduction operation is described in detail.

At the time of activation, a physical machine 100 connected to the network 30 notifies the other physical machines 100 of its participation in the network 30. Each of the physical machines 100 having received the notification sends a response. Depending on whether the response is sent, the physical machine 100 can determine whether the other physical machines 100 are in operation. The determination is performed by the management OS.

First, at step S1, the set of MAC addresses input by a user via the console 20, for example, is obtained from the operations management system 121. At step S2, the use range information is created from the obtained set of MAC addresses, and the created use range information is registered in the common table 201. After the registration, the operation moves on to step S3, and the range of MAC addresses to be used by the physical machine 100 is determined in the set of MAC addresses. After the determination, the operation moves on to step S4.

At step S4, an assignment table 202 having the determined range of MAC addresses registered therein is created. At step S5, the use range information indicating the determined range is created, and the common table 201 is updated to reflect the change by registering the created use range information in the common table 201. The initial introduction operation then comes to an end.

Figure 7:
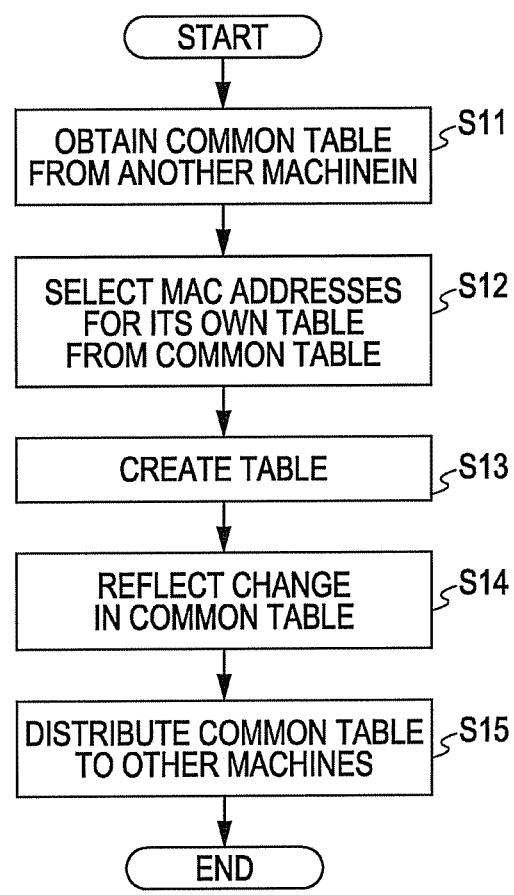
FIG. 7 is a flowchart of a common table acquiring operation.

FIG. 7 is a flowchart of the common table acquiring operation. The acquiring operation is performed for initial setting with the use of the common table 201 transmitted from another physical machine 100, only if the other physical machines 100 sharing the set of MAC addresses are already in operation at the time of activation. Referring now to FIG. 7, the acquiring operation is described in detail.

First, at step S11, the common table 201 received from another physical machine 100 is obtained from the operations management system 121 and is stored therein. At step S12, the common table 201 is referred to, and the range of MAC addresses to be used by its own physical machine 100 is determined (selected) from unused MAC addresses. After the determination, the operation moves on to step S13, and an assignment table 202 having the determined range of MAC addresses registered therein is created. After that, the operation moves on to step S14.

At step S14, the use range information indicating the determined range is created, and the common table 201 is updated to reflect the change by registering the created use range information. At step S15, a request is sent to the operations management system 121, so that the updated common table 201 is distributed to the other physical machines 100. The common table acquiring operation then comes to an end. The request for the common table 201 is transmitted from the operations management system 121 to the management OS and then to the hypervisor 110. In the end, the common table 201 is transmitted from the physical NIC 101 by means of the hypervisor 110.

Figure 8:
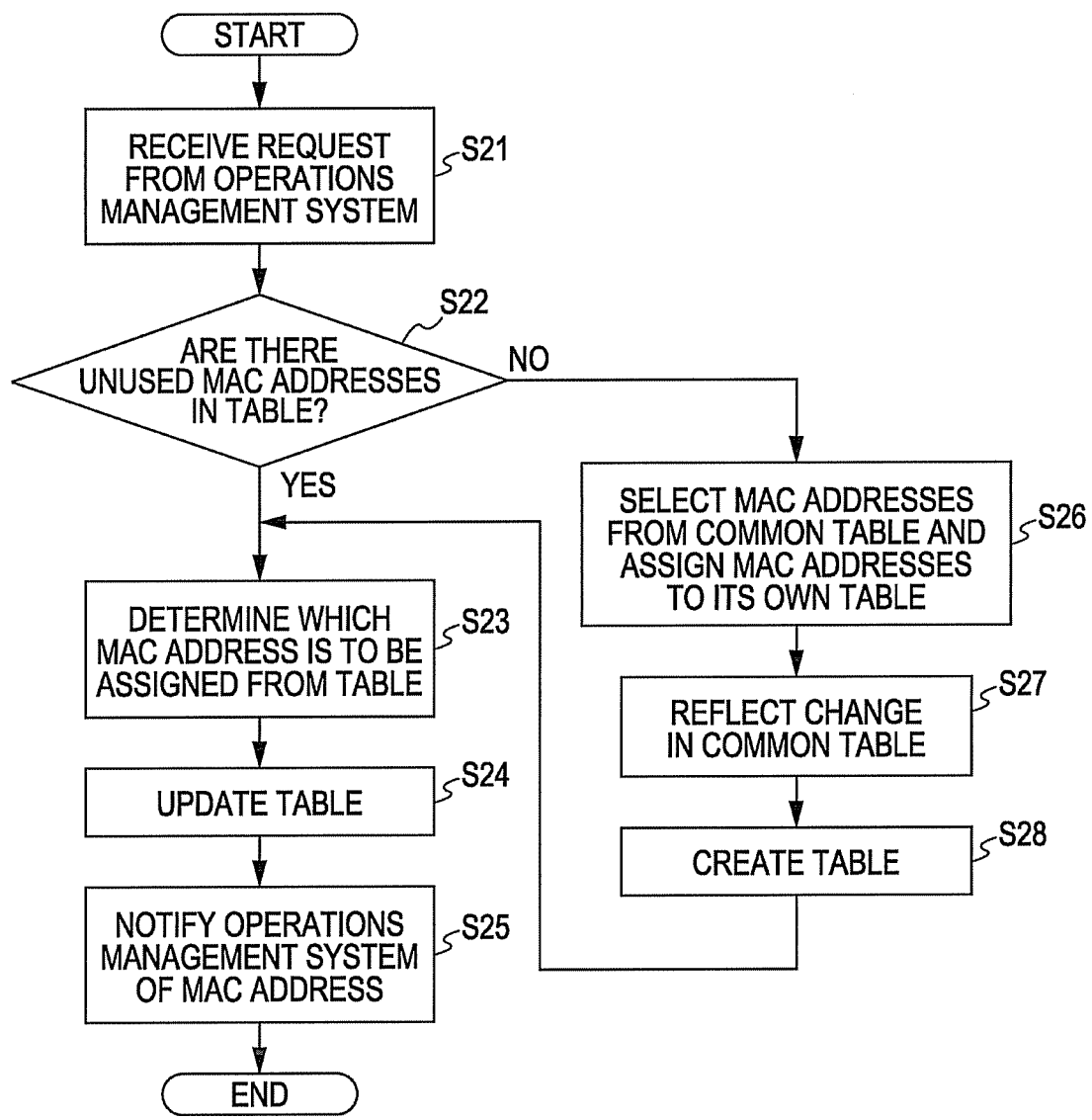
FIG. 8 is a flowchart of a MAC address assigning operation.

FIG. 8 is a flowchart of the MAC address assigning operation. The assigning operation is performed in accordance with a request from the operations management system 121 or an inquiry about the MAC addresses to be assigned. The request is issued when a virtual machine 130 having a virtual NIC 131 is created, or a virtual NIC 131 is created in an existing virtual machine 130. Referring now to FIG. 8, the assigning operation is described in detail.

First, at step S21, a request from the operations management system 121 is received. At step S22, a check is made to determine whether there are unused MAC addresses, by referring to the assignment table 202. If MAC addresses having the use state value "0" indicating "not in use" exist in the assignment table 202, the determination result is "YES", and the operation moves on to step S23. If there is not an unused MAC address existing in the assignment table 202, the determination result is "NO", and the operation moves on to step S26.

At step S23, a MAC address to be assigned is determined from the unused MAC addresses. At step S24, the value of the state of use of the determined MAC address is changed to "1", so as to update the assignment table 202. After the update, the operations management system 121 is notified of the determined MAC address at step S25. The MAC address assigning operation then comes to an end.

At step S26, on the other hand, a predetermined number of MAC addresses are selected from unused MAC addresses and are assigned to its own physical machine 100, by referring to the common table 201. At step S27, the use range information indicating the predetermined number of assigned MAC addresses is registered in the common table 201. At step S28, an assignment table 202 having the predetermined number of assigned MAC addresses registered therein is created. After the creation, the operation moves on to step S23. In the assignment table 202 immediately after the creation, the values of the states of use are all "0".

When the common table 201 is updated by registering use range information, a request for distribution of the updated common table 201 is issued to the operations management system 121 at step S27 or S25. In response to the request, the updated common table 201 is distributed to the other physical machines 100, and is stored in the other physical machines 100.

Figure 9:
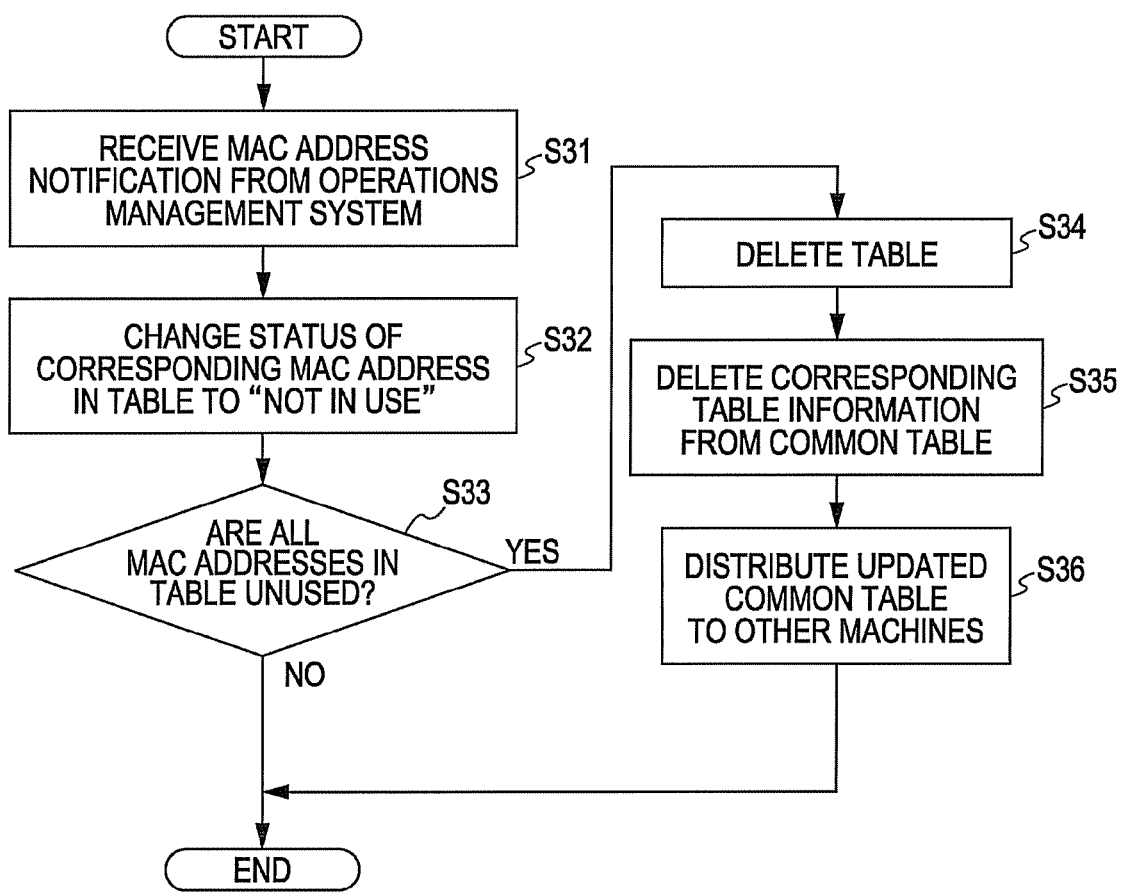
FIG. 9 is a flowchart of a MAC address releasing operation.

FIG. 9 is a flowchart of the MAC address releasing operation. The releasing operation is performed in accordance with a request for cancelling of assignment of a MAC address. The request is issued from the operations management system 121, when a virtual machine 130 having a virtual NIC 131 is deleted, or a virtual NIC 131 is deleted in an existing virtual machine 130. Referring now to FIG. 9, the releasing operation is described in detail.

First, at step S31, a notification indicating the assignment of an MAC address to be cancelled is received from the operations management system 121. At step S32, the value of the state of use of the MAC address in the assignment table 202 is changed to "0", which represents "not in use". The operation moves on to step S33, and a check is made to determine whether the MAC addresses in the assignment table 202 in which the change of the use state value to "0" has just been made are all unused. If the use state values in the assignment table 202 are all "0", the determination result is "YES", and the operation moves on to step S34. If there are one or more states of use having the value "1", the determination result is "NO", and the MAC address releasing operation comes to an end.

At step S34, the assignment table 202 in which the use state values are all "0" is deleted. At step S35, the common table 201 is updated by deleting the use range information corresponding to the deleted assignment table 202. At step S36, a request for distribution of the updated common table 201 is issued to the operations management system 121. After the request, the MAC address releasing operation comes to an end. In response to the request, the updated common table 201 is distributed to the other physical machines 100, and is stored in the other physical machines 100.

Figure 10:
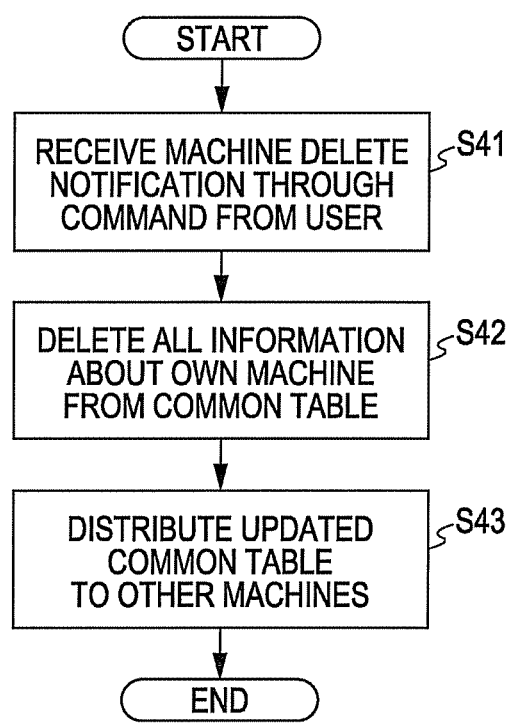
FIG. 10 is a flowchart of a physical machine deleting operation.

FIG. 10 is a flowchart of the physical machine deleting operation. When an instruction to stop (or end) the physical machine 100 is issued from a user via the console 20, for example, the deleting operation is performed under the control of the operations management system 121, so as to release the MAC address resource secured for its own physical machine 100. Referring lastly to FIG. 10, the deleting operation is described in detail.

First, at step S41, a notification indicating that a user has input a delete command through the console 20 or the like is received from the operations management system 121. At step S42, all the use range information about its own physical machine 100 is deleted from the common table 201. The operation then moves on to step S43, and a request for distribution of the updated common table 201 after the deleting is issued to the operations management system 121. After the request, the physical machine deleting operation comes to an end. In accordance with the request, the updated common table 201 is distributed to the other physical machines 100, and is stored in the other physical machines 100.

Figure 11:
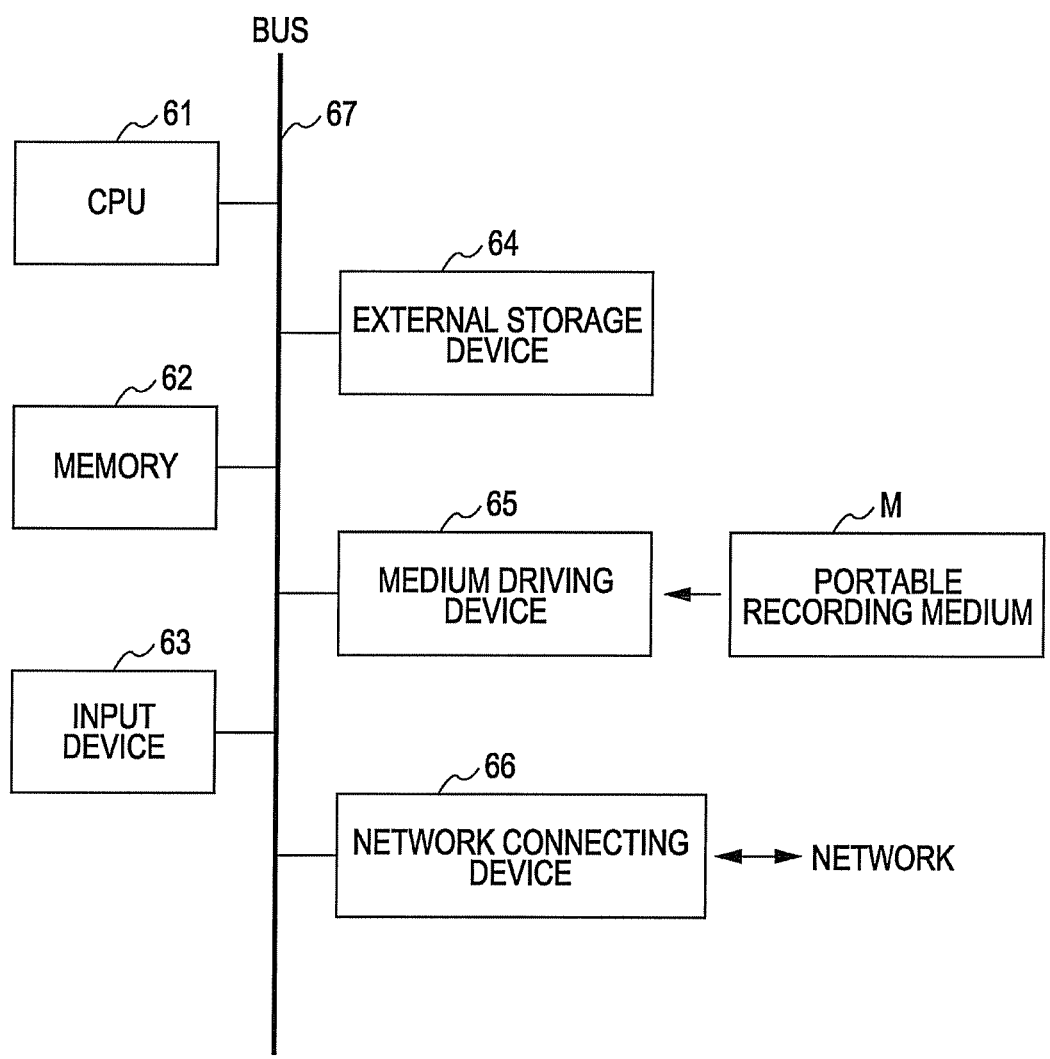
FIG. 11 illustrates an exemplary embodiment of a hardware structure.

FIG. 11 illustrates an embodiment of a hardware structure. Referring now to FIG. 11, the structure of a computer as an information processing device to which this embodiment can be applied is described in detail.

The computer illustrated in FIG. 11 includes a CPU 61 as an arithmetic processing unit, a memory 62 as a storage device, an input device 63, an external storage device 64, a medium driving device 65, and a network connecting device 66 as a communication device. Those components are connected to one another by a bus 67. The structure illustrated in FIG. 11 is merely an example, and the present invention is not limited to that.

The CPU 61 controls the entire computer. The memory 62 is a semiconductor memory such as a RAM that temporarily stores a program or data stored in the external storage device 64 (or a portable recording medium M), at the time of program execution or data update. The CPU 61 loads a program into the memory 62 and executes the program, so as to control the entire computer.

The input device 63 is an interface for the connection with the console 20, for example. The input device 63 exchanges data with the console 20, and transmits received data to the CPU 61. Accordingly, the computer operates in accordance with instructions received through the console 20.

The network connecting device 66 performs communications with the network 30. In the system structure illustrated in FIG. 1, the physical NIC 101 is equivalent to the network connecting device 66. The external storage device 64 is a hard disk device, for example. The external storage device 64 is used mainly for storing various kinds of data and programs.

The medium driving device 65 is used to access the portable recording medium M such as an optical disk or a magnetooptical disk.

The components 61 through 66 illustrated in FIG. 11 are equivalent to the hardware virtualized by the hypervisor 110. The management OS including the hypervisor 110, the operations management system 121, and the server process 122, and the guest OS operated in each virtual machine 130 are stored in the external storage device 64, for example. The common table 201 and the assignment tables 202 are stored in the external storage device 64, for example, and are loaded into the memory 62 whenever necessary. The system structure illustrated in FIG. 1 is realized by the CPU 61 loading the hypervisor 110 into the memory 62, activating the hypervisor 110, loading the program for each of the virtual machines 120 and 130 into the memory 62, and executing the program under the control of the hypervisor 110. The respective operations illustrated in FIGS. 6 to 10 are realized by the CPU 61 operating the management OS including the hypervisor 110, and the operations management system 121 and the server process 122 designed for the management virtual machine 120. The respective programs including the hypervisor 110 and the management OS may be recorded and distributed on the recording medium M, or may be obtained through the network connecting device 66.

In this embodiment, the set of MAC addresses to be shared are registered in the common table 201. However, the set of MAC addresses to be shared may be stored in some other place. Also, in this embodiment, MAC addresses are secured for each physical machine 100 on a predetermined number basis, so as to facilitate the resource management. However, the number of MAC addresses secured for each physical machine 100 may not be limited as above. Rather, several options may be prepared, and one of the options may be selected when the number of MAC addresses to be secured for a physical machine 100 is determined.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. An address assignment method comprising:
   selecting a range of use of addresses being assigned to a virtual network interface card in a virtual machine from a set of addresses, which are shared among a plurality of physical machines, by a physical machine, in the plurality of physical machines, which creates the virtual machine;
   notifying another physical machine of the range of use selected via a network;
   storing the range of use in the another physical machine; and
   selecting another range of use of addresses from the set of addresses to be assigned to another virtual network interface card in another virtual machine being created on the another physical machine from the set of addresses excluding the stored range of use.

2. The address assignment method according to claim 1, wherein each range of use is determined as a predetermined number of addresses.

3. The address assignment method according to claim 1, comprising:
   notifying another physical machine of a range of use that becomes unnecessary through deleting of the virtual network interface card, the notifying carried out by the physical machine deleting the virtual network interface card; and
   deleting the range of use from the stored range of use, the deleting the range of use being carried out by the another physical machine notified of the range of use at the notifying.

4. The address assignment method according to claim 1, comprising
   notifying a physical machine in the plurality of physical machines of the another range of use selected via the network.

5. A computer used as a physical machine that creates a virtual machine, comprising:
   a memory; and
   a processor that executes procedures, the procedures including:
      storing address set information that indicates a set of addresses to be shared among a plurality of physical machines, in the memory;
      receiving first use range information that indicates a range of use of addresses to be assigned from the set of addresses to a virtual network interface card in another virtual machine created by another physical machine sharing the set of addresses, the range of use being transmitted from the another physical machine via a network;
      storing the first use range information;
      setting a range of use of addresses to be assigned to another virtual network interface card in the virtual machine to be created, based on the set of addresses excluding the range of use of the first use range information;
      transmitting second use range information indicating the range of use set corresponding with the another virtual interface card to another physical machine of the plurality of virtual machines via the network; and
      determining a range of use that becomes unnecessary through deletion of the virtual network interface card, the range of use determined within the range of use set,
   wherein the transmitting transmits use range information indicating the unnecessary range of use determined by the determining of a range of use to another physical machine via the network, and
   the storing deletes the use range information indicating the unnecessary range of use when the computer receives use range information from the another physical machine.

6. A non-transitory computer-readable recording medium storing a program that causes a computer to perform operations, the computer being used as a physical machine that creates a virtual machine, said program causing the computer to execute a process comprising:
   receiving first use range information that indicates a range of use of addresses assigned from a set of addresses to a virtual network interface card in another virtual machine created by another physical machine sharing the set of addresses, the range of use being transmitted from the another physical machine via a network;
   storing the first use range information;
   setting a range of use of addresses to be assigned to another virtual network interface card in the virtual machine to be created, based on the set of shared addresses excluding the range of use of the first use range information;
   transmitting second use range information indicating the range of use set in the setting, to another physical machine within the network; and
   determining a range of use that becomes unnecessary through deletion of the virtual network interface card, the range of use determined within the range of use set,
   wherein the transmitting transmits use range information indicating the unnecessary range of use determined by the determining of a range of use to another physical machine via the network, and
   the storing deletes the use range information indicating the unnecessary range of use when the computer receives use range information from the another physical machine.

* * * * *